United States Patent [19]
Berry et al.

[11] Patent Number: 4,965,061
[45] Date of Patent: Oct. 23, 1990

[54] PROCESS FOR REMOVING FLUORIDE FROM A WASTEWATER AND PRODUCING HYDROFLUORIC ACID THEREFROM

[75] Inventors: William W. Berry; Gordon J. Rossiter, both of Lakeland, Fla.

[73] Assignee: Florida Recoveries Partnership, Lakeland, Fla.

[21] Appl. No.: 302,979

[22] Filed: Jan. 30, 1989

[51] Int. Cl.$^5$ .................. C01B 7/19; C01B 33/10; C01C 1/16; C01D 3/02
[52] U.S. Cl. .................. 423/484; 423/325; 423/341; 423/356; 423/470; 423/490; 210/683
[58] Field of Search .............. 423/341, 325, 471, 420, 423/490, 484, 483, 356; 210/676, 683

[56] References Cited
U.S. PATENT DOCUMENTS

| | | | |
|---|---|---|---|
| 3,195,979 | 7/1965 | Burkert et al. | 423/483 |
| 4,062,929 | 12/1977 | Thompson et al. | 423/483 |
| 4,144,315 | 3/1979 | Worthington et al. | 423/490 |
| 4,298,586 | 11/1981 | Sikdar | 423/339 |
| 4,734,200 | 3/1988 | Berry | 210/677 |

Primary Examiner—Gary P. Straub
Assistant Examiner—Brian M. Bolam
Attorney, Agent, or Firm—Burns, Doane, Swecker & Mathis

[57] ABSTRACT

A process for producing hydrofluoric acid from $SiF_6^{2-}$ in a wastewater is disclosed. The process is carried out by (i) combining $(NH_4)_2SO_4$, at a pH high enough such that the sulfate is in its divalent state, with $SiF_6^{2-}$ from said wastewater in an amount in excess of that stoichiometrically required to form $(NH_4)_2SiF_6$ as follows:

$$(NH_4)_2SO_4 + SiF_6^{2-} \rightarrow (NH_4)_2SiF_6 + SO_4^{2-}$$

(ii) concentrating a solution including $(NH_4)_2SiF_6$ and excess $(NH_4)_2SO_4$ to precipitate and separate $(NH_4)_2SiF_6$ of high purity therefrom;
(iii) re-solubilizing the $(NH_4)_2SiF_6$ for reaction with $NH_4OH$ to form $NH_4F$ liquor and precipitated $Si(OH)_4$;
(iv) separating the $NH_4F$ liquor from the precipitated $Si(OH)_4$;
(v) reacting the $NH_4F$ with water to form precipitated $NH_4F \cdot HF$ and ammonia gas;
(vi) reacting $NH_4F \cdot HF$ with $NaF$ to yield precipitated $NaF \cdot HF$ and $NH_4F$ liquor; and
(vii) heating and decomposing the $NaF \cdot HF$ into $HF$ and $NaF$.

6 Claims, 2 Drawing Sheets

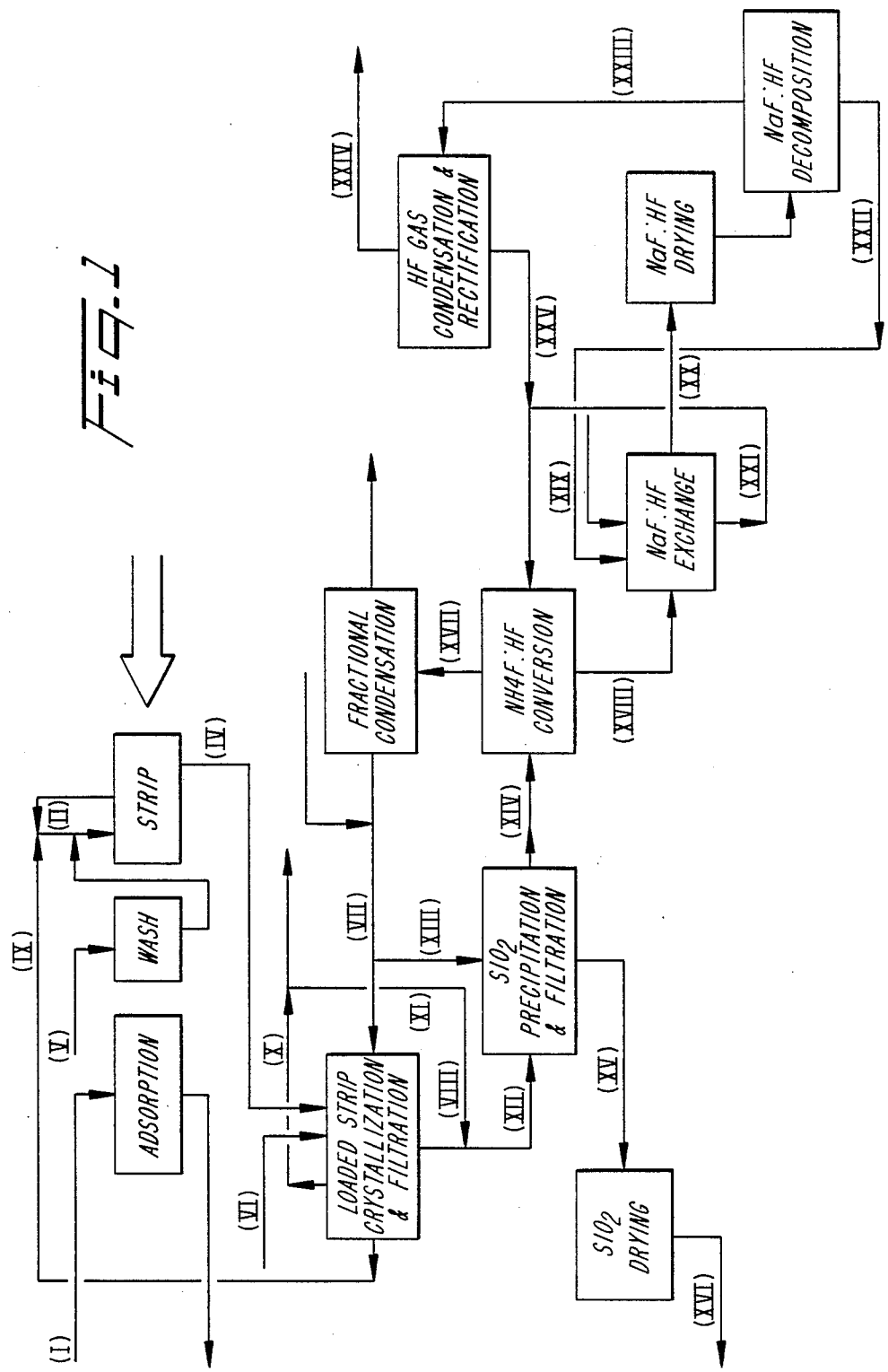

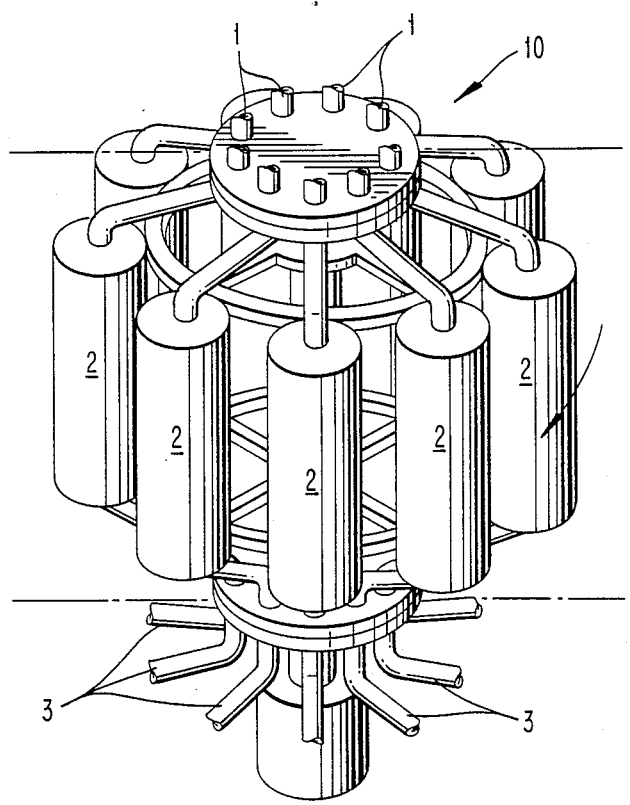

PROCESS FOR REMOVING FLUORIDE FROM A WASTEWATER AND PRODUCING HYDROFLUORIC ACID THEREFROM

BACKGROUND OF THE INVENTION

The present invention relates to the recovery of fluoride ions from waste fluorosilicic acid solution and, more particularly to a process for converting waste fluorosilicic acid into hydrofluoric acid.

Divalent fluorosilicates ($SiF_6^{2-}$) are a by-product associated with wet process phosphoric acid plants. More specifically, during the production of phosphoric acid, relatively large amounts of fluoride vapors are evolved from the acidulation circuit, the evaporation operation and from other processing steps. To avoid discharge of this fluoride into the atmosphere, scrubber systems are utilized throughout the plant. Furthermore, large amounts of fluoride vapors are evolved in the phosphoric acid evaporators and are collected in barometric condensers. The water used in the scrubbers and barometric condensers, as well as water used to slurry the gypsum for disposal, is discharged into gypsum and cooling pond systems.

Where phosphoric acid is further processed through ammonium phosphate or superphosphate plants to produce a variety of fertilizer products, still more fluoride is evolved. Once again, to prevent escape of the fluoride gases into the atmosphere, scrubbers are employed and the fluorides returned to cooling ponds.

To recover fluoride from the pond water system described above, the pond water can be diverted to a fluoride recovery plant and, upon removal of the fluoride from the water, returned to the pond. Thus, in U.S. Pat. No. 4,734,200, there is described a process for the removal of fluoride contaminants from an acidic process wastewater. More specifically, it was discovered, unexpectedly, that fluorides such as $SiF_6^{2-}$ could be removed from an acidic process wastewater by contacting the wastewater at pH levels between about 1.5 and 2.0 with a strong base ion exchange resin. Such $SiF_6^{2-}$-loaded resin was then regenerated by contacting it with a compound capable of stripping the fluoride from the resin and forming water-soluble commercially useful end products or intermediates capable of being converted to commercially useful end products. Included among such compounds were sulfuric acid, ammonium sulfate, and ammonium bisulfate, the particular compound used not being critical so long as the fluoride salt thereby formed was water-soluble thereby enabling it to be washed out of the resin. The pH of the solution containing the ammonium silicofluoride strip solution was then raised, e.g., by adding ammonia, to increase the pH of the solution to between about 8.5 and 9.0 thereby precipitating an activated silica compound. After removing the silica, the filtrate solution including ammonium fluoride was then used as an intermediate for various commercially useful fluoride compounds such as calcium fluoride, hydrofluoric acid, metallic fluorides and the like.

The preparation of hydrofluoric acid from the wastewater is particularly advantageous because, while simultaneously removing a contaminant from a wastewater, a commercially valuable end product is produced. Additionally, the ability to produce hydrofluoric acid from an acidic process wastewater is an attractive alternative to current commercial methods for producing hydrofluoric acid. More specifically, hydrofluoric acid is generally produced by reacting sulfuric acid and high grade calcium fluoride (fluorospar). The process typically involves the intimate mixing of the fluorospar and sulfuric acid to initiate the chemical reaction wherein the calcium fluoride and sulfuric acid mixture is converted to hydrogen fluoride and calcium sulfate. The resulting mixture is subsequently treated in a rotary kiln and hydrogen fluoride evolved from the reaction mass. The hydrogen fluoride gas is then treated and subsequently condensed to form anhydrous hydrogen fluoride.

The above process, although being the primary means through which hydrofluoric acid is produced, is somewhat difficult to carry out since it involves the handling of the hydrogen fluoride-laden gas throughout most of the process. Additionally, the cost and availability of fluorospar are subject to wide and unpredictable fluctuations and thus, elimination of fluorospar as a starting material could be highly advantageous since it is generally the most significant factor affecting commercial production of hydrofluoric acid.

SUMMARY AND OBJECTS OF THE INVENTION

Thus, in terms of eliminating a contaminant in an acidic process wastewater, producing a commercially valuable end product and eliminating reliance on the use of fluorospar as a starting material, it would be highly advantageous to provide a process for producing anhydrous hydrogen fluoride from an acidic process wastewater. It is, therefore, a primary objective of the present invention to fulfill that need by providing a process for recovering high purity fluoride from an acidic process wastewater and by providing a process wherein the recovered high purity fluoride is converted to hydrofluoric acid.

It is another object of the present invention to provide a process for producing hydrofluoric acid which does not require the use of unreliable starting materials such as fluorospar for its production.

Another object of the present invention is to provide a process for producing hydrofluoric acid which does not generate the product gas until the last step of the process thereby avoiding the difficulties associated with handling such gas until the very end of the process.

In a first aspect, the present invention relates to a process for recovering $SiF_6^{2-}$ from the wastewater comprising (i) adding $(NH_4)_2SO_4$, at a pH high enough such that the sulfate is in its non-protonated state, to said wastewater in an amount in excess of that stoichiometrically required to form a solution containing $(NH_4)_2SiF_6$ and excess $(NH_4)_2SO_4$ as follows:

$$(NH_4)_2SO_4 + SiF_6^{2-} \rightarrow (NH_4)_2SiF_6 + SO_4^{2-}; \text{ and}$$

(ii) concentrating said solution to cause a high purity $(NH_4)_2SiF_6$ to precipitate therefrom and separating said precipitate from said solution.

In a second aspect, the present invention relates to a process for producing hydrofluoric acid from a wastewater including $SiF_6^{2-}$ comprising the steps of:

(i) combining $(NH_4)_2SO_4$, at a pH high enough such that the sulfate is in its non-protonated state, with $SiF_6^{2-}$ from the wastewater in an amount in excess of that stoichiometrically required to form $(NH_4)_2SiF_6$ as follows;

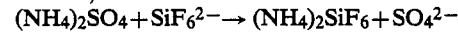
$$(NH_4)_2SO_4 + SiF_6^{2-} \rightarrow (NH_4)_2SiF_6 + SO_4^{2-}$$

(ii) concentrating a solution including $(NH_4)_2SiF_6$ and excess $(NH_4)_2SO_4$ to precipitate and separate $(NH_4)_2SiF_6$ of high purity therefrom;

(iii) resolubilizing the $(NH_4)_2SiF_6$ for reaction with $NH_4OH$ to form an $NH_4F$ liquor and precipitated $Si(OH)_4$;

(iv) separating the $NH_4F$ liquor from the precipitated $Si(OH)_4$;

(v) reacting the $NH_4F$ with water to form precipitated $NH_4F.HF$ and ammonia gas;

(vi) reacting $NH_4F.HF$ with $NaF$ to yield precipitated $NaF.HF$ and $NH_4F$ liquor; and (vii) heating and decomposing the $NaF.HF$ into $HF$ and $NaF$.

In a preferred embodiment, the process for producing hydrogen fluoride is carried out in an Advanced Separation Device (hereinafter referred to as the ASD) which enables continuous feeding of wastewater including $SiF_6^{2-}$ and continuous feeding of an $(NH_4)_2SO_4$ strip solution through fixed points which are in periodic fluid communication with a plurality of beds of anion exchange resin.

With the foregoing and other objects, advantages, and features of the invention that will become hereinafter apparent, the nature of the invention may be more clearly understood by reference to the following detailed description of the invention, the appended claims and the drawings.

BRIEF DESCRIPTION OF THE DRAWING

FIG. 1 is a schematic illustration of the process for producing hydrofluoric acid according to the present invention; and FIG. 2 is a perspective view of the ASD.

DETAILED DESCRIPTION OF PREFERRED EMBODIMENTS

The wastewaters treated in accordance with the present invention for the recovery of $SiF_6^{2-}$ and ultimately, for the production of hydrofluoric acid, are generally acidic process wastewaters associated with production of phosphoric acid, such as by reacting sulfuric acid with phosphate rock to produce phosphoric acid and by-product gypsum. Thus, in such processes fluoride vapors are evolved from the acidulation circuit, the evaporation operation and from other processing steps and those fluoride vapors as well as fluoride vapors evolved in the phosphoric acid evaporators are collected and sent to gypsum and cooling pond systems.

It has been found that acidic processes wastewaters as described above typically have a pH ranging from about 1.5 to about 2.0 and contain about 5,000 to 10,000 parts per million of fluoride compound, 5,000 to 10,000 parts per million of phosphate expressed as $P_2O_5$ and greater than 500 parts per million of ammonium ion. The fluoride component is believed to be comprised primarily of $SiF_6^{2-}$.

The $SiF_6^{2-}$ in the wastewater solution is removed therefrom by reacting it with $(NH_4)_2SO_4$ to form $(NH_4)_2SiF_6$. In this regard, it has been observed, unexpectedly, that in addition to reacting with $SiF_6^{2-}$ to form $(NH_4)_2SiF_6$, the $(NH_4)_2SO_4$ when used in excess actually reduces the solubility of $(NH_4)_2SiF_6$ in water thus enabling relatively pure $(NH_4)_2SiF_6$ to be precipitated from the solution upon the concentration thereof. In this regard, while a portion of such decrease in solubility might be attributed to the common ion effect, the degree of purity of the precipitate as well as the extent to which the salting out occurs are greater than what would normally be expected. For this purpose, an amount of $(NH_4)_2SO_4$ in excess of the stoichiometric amount required for reaction with the $SiF_6^{2-}$ should be employed. In general, therefore, 1.5 to 5.0 and preferably 1.5 to 3.0 moles of $(NH_4)_2SO_4$ should be added per mole of $SiF_6^{2-}$ recovered from the wastewater.

Due to the salting-out effect of the $(NH_4)_2SO_4$ present in the wastewater, $(NH_4)_2SiF_6$ precipitates therefrom when the wastewater is concentrated.

The overall process for producing hydrofluoric acid from an acidic process wastewater is illustrated schematically in FIG. 1.

Initially, the fluoride ion concentration in the wastewater is increased by an ion exchange method. More specifically, a wastewater stream (I) including $SiF_6^{2-}$ is loaded onto an anion exchange resin. The anion exchange resin selected is one which exhibits greater affinity for $SiF_6^{2-}$ than it does for other anions present in the wastewater such as $H_2PO_4^-$. The anion associated with the resin may be any of those typically employed for such applications, the principal criteria in its selection being convenience, availability, and compatibility with regeneration media. Typical anions for such purposes include, but are not limited to, hydroxide, sulfate, bisulfate, chloride and carbonate.

A strong base ion exchange resin found to be advantageous is DOW TG550A manufactured by Dow Chemical which has an affinity for the fluoride ion at the natural pH of the pond water to be treated, i.e., having a pH ranging from about 1.5 to 2.0. Other suitable resins include DUOLITE A101D, IRA 900 C and IRA 910, which are manufactured by Rohm and Haas.

Because the anion exchange resin is more selective for the $SiF_6^{2-}$ ion than it is for other anions present in the wastewater, the resin obviously has a far greater number of $SiF_6^{2-}$ species adsorbed thereto as compared to other anionic species.

The $SiF_6^{2-}$ is next stripped from the resin by passing a strip solution (II) of ammonium sulfate through the bed. In order to keep the majority of the sulfate in its non-protonated state $(SO_4^{2-})$, the initial pH of the strip solution is maintained above a minimum value of about 4 via adjustment of the $NH_4/SO_4$ ratio during the ammonium sulfate preparation and lean strip treatment steps. Additionally, recycled $(NH_4)_2SO_4$ (IX) from the crystallizer is added to the strippant. As the strip solution passes through the resin, the previous adsorption process is reversed and the $SiF_6^{2-}$ ions returned to an aqueous phase, in a higher concentration and with fewer impurities. The exiting strip solution (IV) typically contains between about 5 and 7% fluoride. It is noted that while $(NH_4)_2SO_4$ is the preferred strippant, other materials can be used such as $H_2SO_4$, $(NH_4)_2CO_3$ and the like although solids precipitation must be watched. Ammonium chloride is chemically acceptable but less desirable due to its chloride content and potential for contamination of the phosphoric acid facility.

To maximize the process efficiency, it is advantageous to pass a stream of water (V) through the stripped resin to remove entrained ammonium ions and to maximize fluoride recovery. The used wash water can be added to the incoming $(NH_4)_2SO_4$ strip solution.

The strip solution (IV) is concentrated, such as in an evaporator system which serves as a crystallizer. Thus, by increasing the concentration of the solution, the solubility limit of the ammonium flourosilicate salt is exceeded, and it precipitates out of solution. The $SO_4$ in the solution is concentrated to about 25–30% which results in a rejection of up to 85% of the fluoride as $(NH_4)_2SiF_6$. The slurry is cooled, $(NH_4)_2SiF_6$ crystals (VIII) are removed, and the supernatant $(NH_4)_2SO_4$ liquor (IX) is recycled to the resin bed as strip solution. Sulfate and ammonia make-up to the strip solution is done in the crystallizer by the addition of concentrated $H_2SO_4$ (VI) and recycle $NH_4OH$ (VII).

This solubility relationship, i.e., $(NH_4)_2SiF_6$ in $(NH_4)_2SO_4$, is important because it has been found that through a mass action relationship, increasing the concentration of ammonium sulfate in the fluoride bearing strip solution will preferentially depress the solubility of ammonium silicofluoride thereby enabling it to be precipitated as a relatively pure salt. This, in turn, provides for a relatively straight forward method for rapidly producing an intermediate material containing a high concentration of fluoride, thus minimizing the size of subsequent downstream processing operations. While, as previously indicated, a portion of such solubility depression might be attributed to the common ion effect, the results obtained using the process of the invention are superior even to what would be expected from the common ion effect in terms of both the extent of the reduced solubility and the purity of the precipitant. Thus, it has been found, unexpectedly, that the precipitant is of a purity greater than 98.0% and possibly, if an additional washing step is employed, even greater than 99.5%. Additionally, by virtue of the relationship between the ammonium sulfate concentration and the precipitation, it is possible, through proper control of the system chemistry, to conduct the precipitation externally to the continuous ion exchange system thereby yielding the intermediate ammonium silicofluoride salt.

Thickened $(NH_4)_2SiF_6$ slurry is filtered and then the cake is washed with a saturated $(NH_4)_2SiF_6$ solution to remove entrained impurities. Wash liquor is returned to the crystallizer. The washed coke normally contains about 2% $SO_4$ and less than 1,000 PPM $PO_4$. As referred to previously, greater $(NH_4)_2SiF_6$ cake purity is achievable through wash optimization, since the impurities observed result primarily from surface entrained liquid or mother liquor. A portion of the water vapor (X) evolved in the crystallization process is condensed and used as dilution water (XI) for redissolving the cake to produce an ammonium fluorosilicate liquor.

Resolubilized $(NH_4)_2SiF_6$ (XII) is reacted with a recycle stream of $NH_4OH$ (XIII) to form a slurry (XIV) of ammonium fluoride liquor and silicon hydroxide precipitate (XV) according to the following reaction:

$$(NH_4)_2SIF_6 + 4NH_4OH \rightarrow 6NH_4F + Si(OH)_4$$

The pH of the reaction slurry is maintained at 9.5–9.7 which forces the reaction to completion. The reaction is conducted within a 90°–110° F. temperature range. A staged, agitated reactor system is used for this process. The silica slurry is filtered, and the $Si(OH)_4$ cake is washed to remove entrained impurities. The cake (VIII) is then dried to produce byproduct silica (XVI).

The $NH_4F$ filtrate (XIV) from the above process is fed to a second evaporator, referred to as a "converter." In this step, the fluoride concentration of the solution is increased to 40–43% by evaporation at atmospheric pressure. The fluoride is converted to ammonium bifluoride ($NH_4F.HF$) via the following reaction;

$$6NH_4F \xrightarrow[H_2O]{Heat} 3NH_4F.HF + 3NH_3$$

Some water is separated from the converter overheads (XVII) by fractional condensation prior to adsorbing $NH_3$ and $H_2O$ vapors into a concentrated $NH_4OH$ stream (VII and XIII). Conversion of the fluoride to bifluoride is typically 70–80% complete under normal operating conditions.

Product liquor from the converter is cooled, and most of the $NH_4F.HF$ precipitates while the $NH_4F$ remains in solution. The slurry is thickened and the supernatant liquor is recycled.

Ammonium bifluoride (XVIII) is next reacted with recycled sodium fluoride (XIX), in stirred-tank reactors, to produce solid $NaF.HF$ (XX) and $NH_4F$ liquor (XXI). This reaction is controlled within a 90°–110° F. temperature range to optimize the bifluoride exchange, and proceeds according to the following equation;

$$NH_4F.HF + NaF \rightarrow NaF.HF + NH_4F$$

The product slurry is filtered, and the $NH_4F$ filtrate is recycled to the converter.

The sodium bifluoride cake (XX), after being water washed, is dried, to essentially zero moisture, then calcined at 550°–650° F. Within this temperature range, the $NaF.HF$ decomposes to hydrogen fluoride gas and NaF solid. The NaF (XXII) is collected and recycled. HF gas (XXIII) is condensed and rectified to remove contained water then transferred as stream (XXIV) to anhydrous HF storage. Rectifier bottoms (XXV) contain 35% HF which is recycled to the converter.

In the more preferred embodiment, the adsorption of $SiF_6^{2-}$ onto the anion exchange resin, the stripping of the $SiF_6^{2-}$ from the resin with a strip solution and intermediate washing steps are carried out in the ASD10, illustrated at FIG. 2. The ASD is described in detail in U.S. Pat. No. 4,522,726. It comprises a plurality of fixed feed ports 1 to each of which may be supplied the various feed materials. Moving about a circular path in periodic fluid communication with each of the above-described fixed feed ports are a plurality of chamber 2 filled with the anion exchange resin which interacts with the feed fluids.

It will be appreciated that the feed materials are supplied continuously to the respective fixed feed ports 1 for periodic interaction with the resin in each of the chambers 2. In similar fashion, a plurality of fixed discharge ports 3 are provided at an end of the chambers opposite to that of the fixed feed ports 1. Thus, each fixed feed port 1 has a corresponding fixed discharge port 3. Quite clearly, fluid fed through one of the fixed feed ports 1 which has interacted with the resin in the chamber 2 and been discharged through the fixed discharge port 3 may, at the option of the operator, be purged from the system, recirculated back to a selected feed port or a combination of both.

The fluoride ion in the acidic process wastewater can be removed therefrom using the ASD. The ASD is chosen such that the plurality of fixed feed ports are divided into an adsorption zone, a stripping zone, and a washing zone. Each of these zones is defined by one or more of the fixed feed ports and corresponding fixed discharge ports.

The fluoride is first concentrated by feeding the wastewater to one or more of the fixed ports defining the adsorption zone illustrated in FIG. 1 whereby $SiF_6^{2-}$ is adsorbed onto the resin in the chambers corresponding to that zone at that time. A stripping solution containing $(NH_4)_2SO_4$ is fed to the fixed feed points defining the stripping zone so that, as the chambers containing $SiF_6^{2-}$ adsorbed resin come into fluid communication with the ports defining the stripping zone, the $SiF_6^{2-}$ is desorbed from the resin to form $(NH_4)_2SiF_6$ which is discharged.

Finally, the stripped resin, which contains primarily entrained ammonium ions, is passed through the washing zone defined by a plurality of fixed feed ports through which a wash water is fed. Preferably, the wash zone is defined by four fixed ports and water is fed into one of the ports and circulated countercurrently, i.e., against the direction of chamber rotation, to the remaining three ports. The used wash water ultimately recovered is added to the incoming $(NH_4)_2SO_4$ strip solution.

The process then continues as described previously, with the strip solution being concentrated to precipitate $(NH_4)_2SiF_6$.

The following example is given by way of illustration and should in no way be viewed as limiting the process presently disclosed and claimed.

In order to produce 100 pounds of anhydrous HF, 3,820 gallons of acidic pond water containing 0.45% F as $SiF_6$, 0.45% $SO_4$ and 1.04% $PO_4$ were fed to the adsorption zone of the ASD. Strong base anion exchange resin, such as Dow Chemical's TG550A, (27.5 ft.$^3$) was then used to adsorb 65% of the fluoride from the water. Eighty percent of the resin's ion exchange capacity was required. The effluent water contained 0.16% F, 0.70% $SO_4$ and 1.02% $PO_4$.

Next, 120 gallons of 37% $(NH_4)_2SO_4$ strip solution, containing 1.2% F and 0.7% $PO_4$ and diluted with 103 gallons of used wash water were contacted with the loaded resin, in a 4-stage countercurrent fashion, producing 216 gallons of loaded strip solution that contained 5.3% F (109 pounds), 11.9% $SO_4$ and 0.4% $PO_4$.

The loaded strip solution was then concentrated in a crystallizer. The solution was fortified with 92 pounds of 96% $H_2SO_4$ and 81 pounds of 35% $NH_4OH$. The concentration was elevated to 27% $SO_4$, by evaporating 837 pounds of $H_2O$.

After cooling and filtering the slurry, 175 pounds of moist cake were produced, containing 148 pounds of $(NH_4)_2SiF_6$ (or 95 pounds of F), 4.4 pounds of $SO_4$ and 0.1 pound of $PO_4$. About 85% of the fluoride was precipitated. The cake was redissolved with 55 gallons of deionized (DI) water to produce 70 gallons of liquor with a fluoride concentration of 15%. This solution was reacted with 177 pounds of 35% $NH_4OH$ at 105° F. and 9.6 pH for 40 minutes. The slurry was filtered, and the silica cake was washed with DI $H_2O$. About 200 pounds of $Si(OH)_4$ filter cake, containing 25% $SiO_2$, were produced, then fed to an indirect dryer and heated at 750° F. for 1 hour. Approximately 53 pounds of silica were produced with an assay of 95% $SiO_2$ and 5% $H_2O$.

Seventy gallons of $NH_4F$ filtrate, containing 15.6% F were produced in the $SiO_2$ precipitation process. It was mixed with 67 gallons of $NH_4F$ recycled from the NaF.HF exchange process and heated in the converter at 240°-265° F. where 578 pounds of $H_2O$ and 90 pounds of $NH_3$ were evolved as gases. The $NH_3$ was recovered, as 35% $NH_4OH$, and recycled for use upstream. About 75% of the $NH_4F$ was converted to $NH_4F.HF$, and the 521-pound slurry stream contained 41.0% F and 21.0% $NH_3$.

The $NH_4F.HF$ slurry was reacted with 233 pounds of 99.0% sodium fluoride (110% of stoichiometric amount) for 60 minutes at 95° F. to produce NaF.HF and $NH_4F$. This slurry was then filtered, and the NaF.HF cake was washed with 22 gallons of DI $H_2O$ to remove entrained impurities. The wash water was combined with the $NH_4F$ filtrate producing a total of 579 pounds of solution containing 20.5% F and 18.9% $NH_3$.

Approximately 362 pounds of NaF.HF cake can be produced containing 55.1% F, 34.9% Na and 10.0% moisture. This cake is heated to 280° F. in an indirect dryer for 60 minutes and the moisture content reduced to 150 PPM. The 326 pounds of dried cake, when heated to 660° F. in an indirect-heated calciner for 90 minutes, produce 100 pounds of HF gas and 226 pounds of NaF cake. The gas can be condensed to result in a product containing 99.95% HF and 480 PPM $H_2O$.

Thus, by virtue of the process disclosed and claimed, a heretofore waste product is converted into a commercially valuable end product. Additionally, because the HF is not formed until the very last step of the process, the problems attendant with the handling of an HF-laden gas throughout a process are eliminated. The process is also advantageous in that it recycles virtually all of the non-reacted materials thereby minimizing the effect of low conversion efficiency and conserving overall process efficiency.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. A process for producing hydrofluoric acid from $SiF_6^{2-}$ comprising the steps of:
   (i) combining $(NH_4)_2SO_4$, at a pH high enough such that the sulfate is in a non-protonated state, with $SiF_6^{2-}$ from said wastewater in an amount in excess of that stoichiometrically required to form $(NH_4)_2SiF_6$ as follows:

$$(NH_4)_2SO_4 + SiF_6^{2-} \rightarrow (NH_4)_2SiF_6 + SO_4^{2-}$$

(ii) concentrating a solution including $(NH_4)_2SiF_6$ and excess $(NH_4)_2SO_4$ to precipitate separate $(NH_4)_2SiF_6$ therefrom, wherein the separated $(NH_4)_2SiF_6$ has a higher purity than if stoichiometric ratios of the reactants had been used.
   (iii) re-solubilizing the $(NH_4)_2SiF_6$ for reaction with $NH_4OH$ to form $NH_4F$ liquor and precipitated $Si(OH)_4$;
   (iv) separating the $NH_4F$ liquor from the precipitated $Si(OH)_4$;
   (v) reacting the $NH_4F$ with water to form precipitated $NH_4F.HF$ and ammonia gas;
   (vi) reacting $NH_4F.HF$ with NaF to yield precipitated NaF.HF and $NH_4F$ liquor; and
   (vii) heating and decomposing the NaF.HF into HF and NaF.

2. The process of claim 1 wherein 1.5–5.0 moles of $(NH_4)_2SO_4$ are employed per mole of $SiF_6^{2-}$ recovered from the wastewater.

3. The process of claim 2 wherein 1.5–3.0 moles of $(NH_4)_2SO_4$ are employed per mole of $SiF_6^{2-}$.

4. The process of claim 1 wherein the $(NH_4)_2SO_4$ is combined with $SiF_6^{2-}$ adsorbed onto an anion exchange resin in step (i) to form a solution of free $(NH_4)_2SiF_6$ and excess unexchanged $(NH_4)_2SO_4$ which are then separated from said anion exchange resin.

5. The process of claim 4 further including:
   feeding the wastewater including $SiF_6^{2-}$ through at least one fixed port;
   feeding the $(NH_4)_2SO_4$ strip solution through at least one fixed port;
   rotating a plurality of beds of anion exchange resin about a circular path in periodic fluid communication with the fixed ports;
   the anion exchange resin, when in fluid communication with the wastewater being fed through at least one fixed port, being loaded with $SiF_6^{2-}$ ions; and
   the anion exchange resin, when in fluid communication with the $(NH_4)_2SO_4$ solution, having the $SiF_6^{2-}$ stripped therefrom by formation of $(NH_4)_2SiF_6$.

6. The process of claim 5 wherein the $(NH_4)_2SO_4$ strip solution is fed through at least two fixed ports and wherein an eluant interaction product formed by passing $(NH_4)_2SO_4$ through a first fixed port is directed to at least one additional fixed port in a direction opposite to that in which the beds of anion exchange resin rotate.

* * * * *